Aug. 26, 1924.
C. S. LUNDGREN
FLOOR SCRUBBING MACHINE
Filed July 19, 1919
1,506,016
9 Sheets-Sheet 3
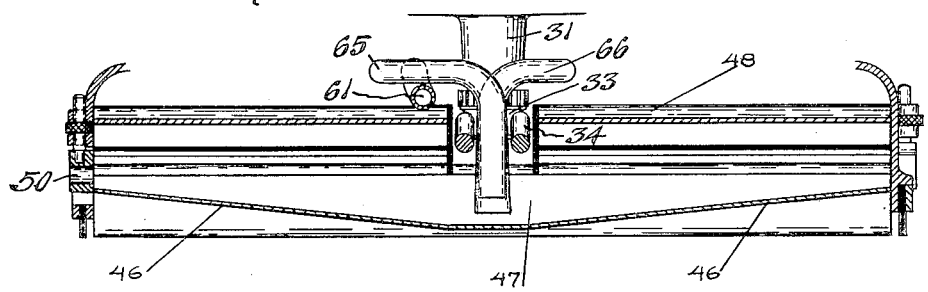
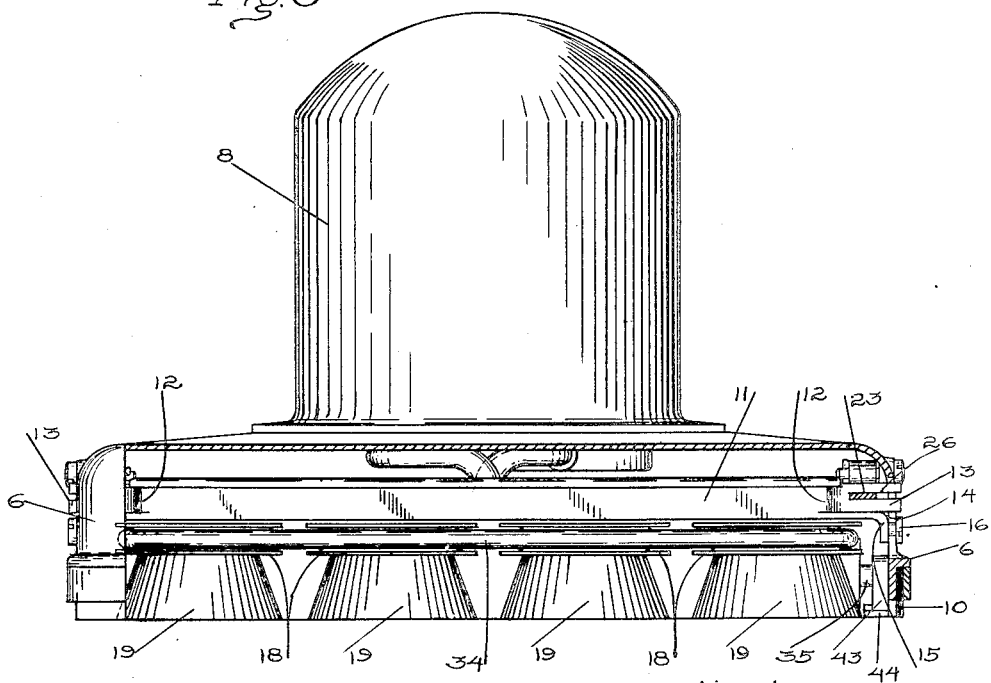

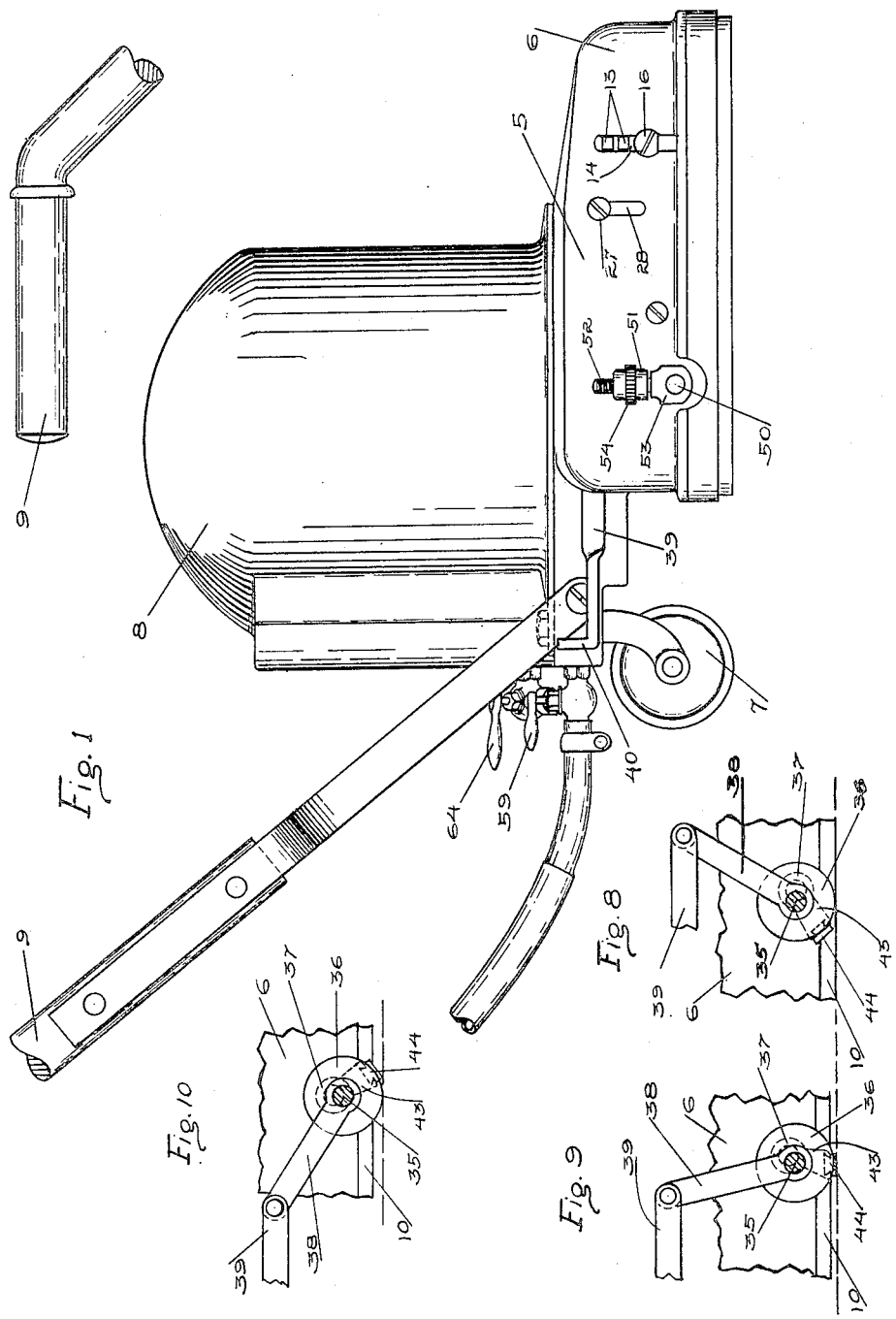

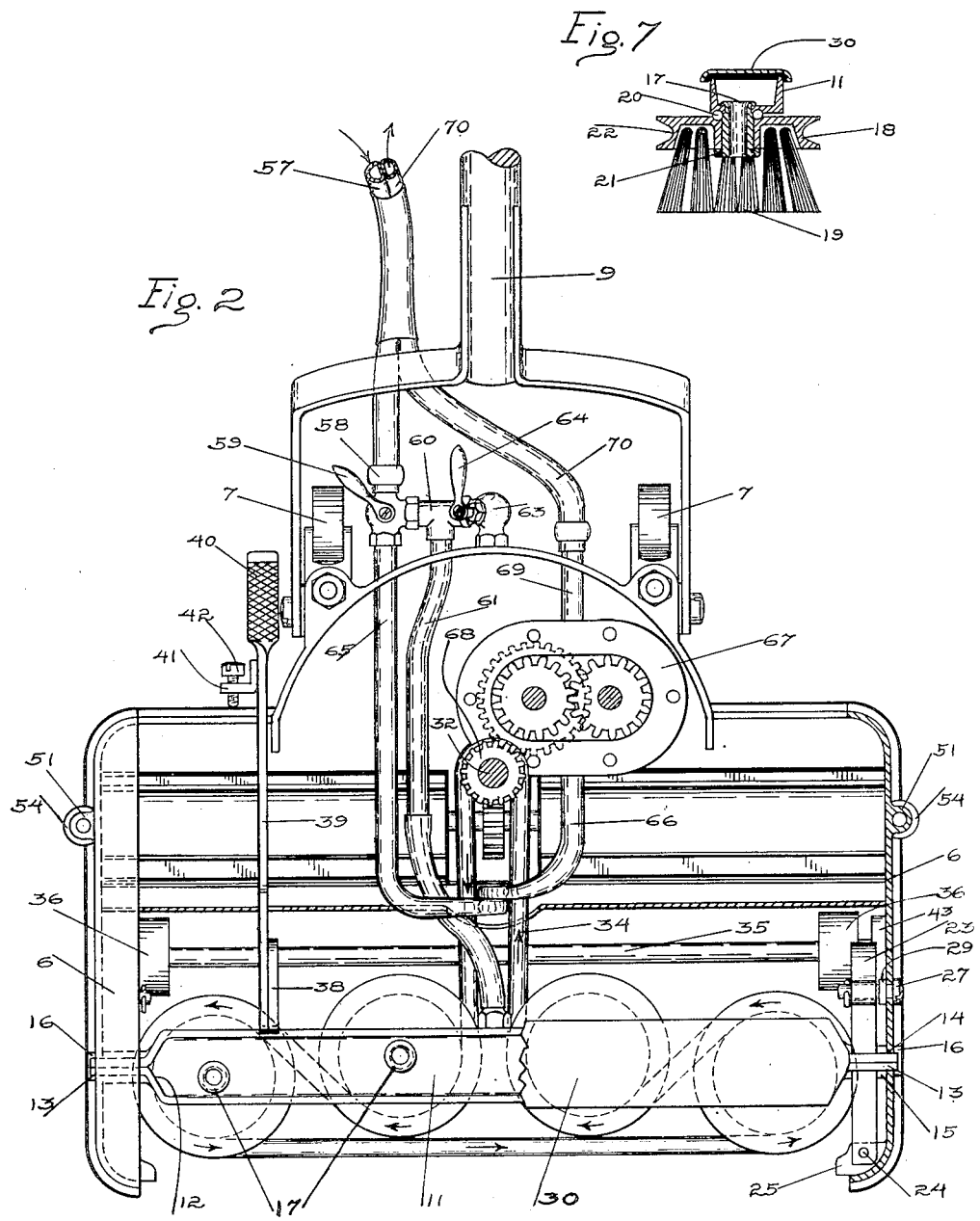

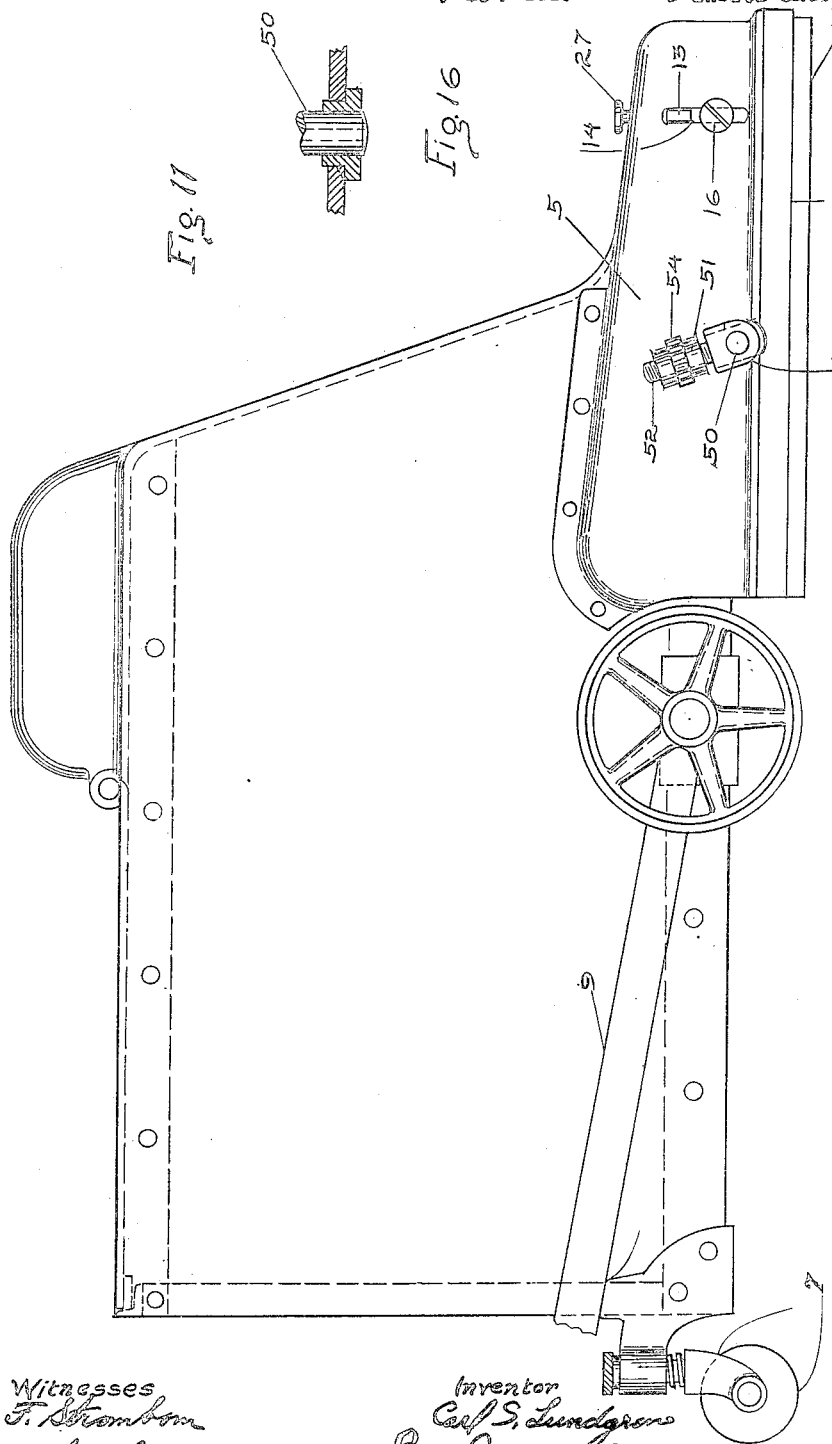

Aug. 26, 1924.

C. S. LUNDGREN 1,506,016

FLOOR SCRUBBING MACHINE

Filed July 19, 1919      9 Sheets-Sheet 6

Fig. 12

Witnesses
J. F. Strombom
Bertha Long

Inventor
Carl S. Lundgren
By S. George Tatt
Atty.

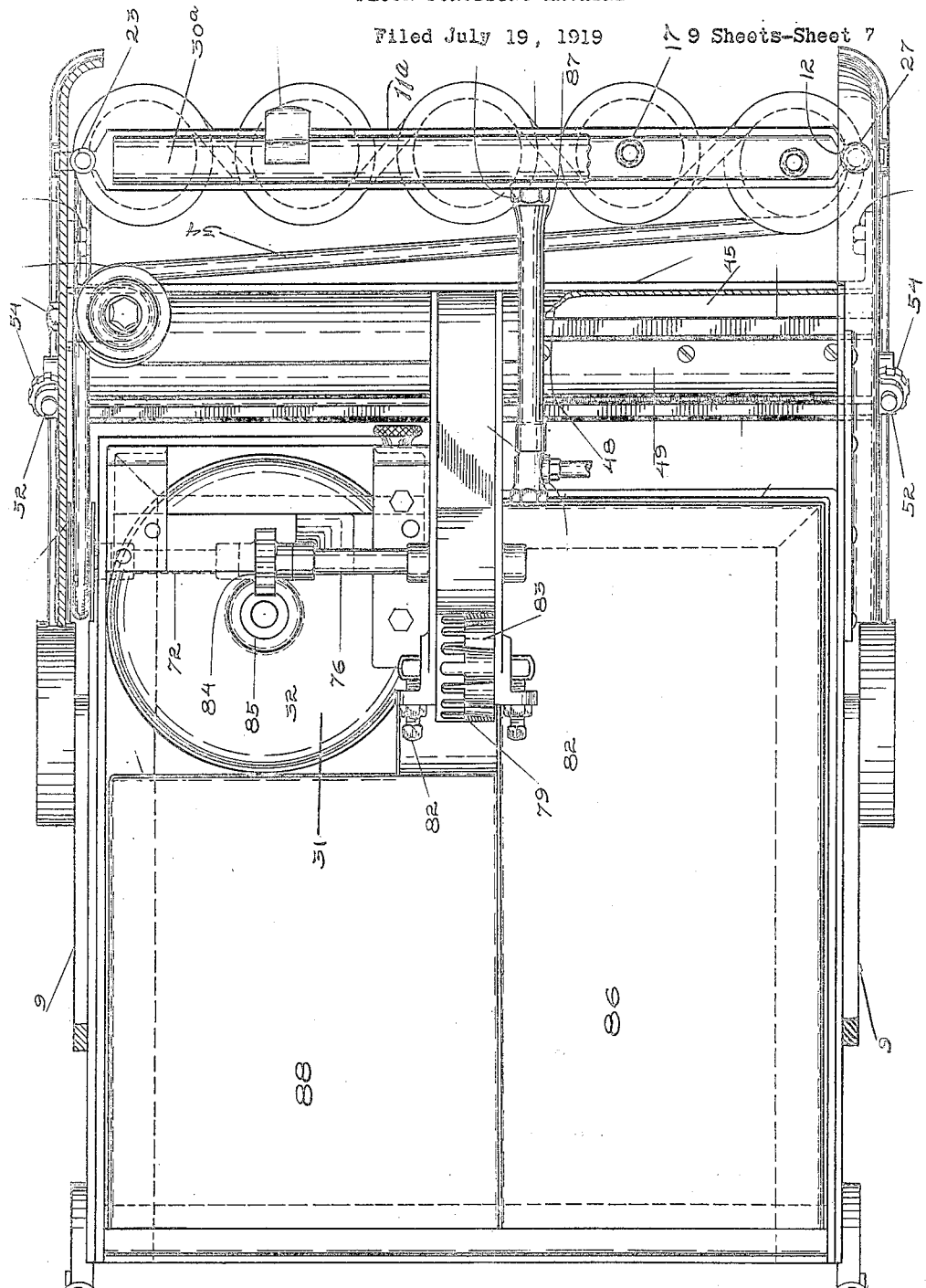

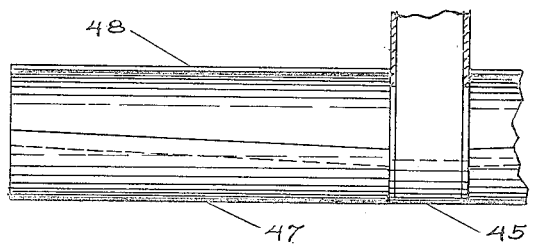
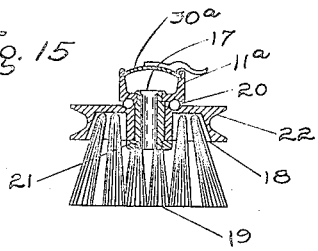
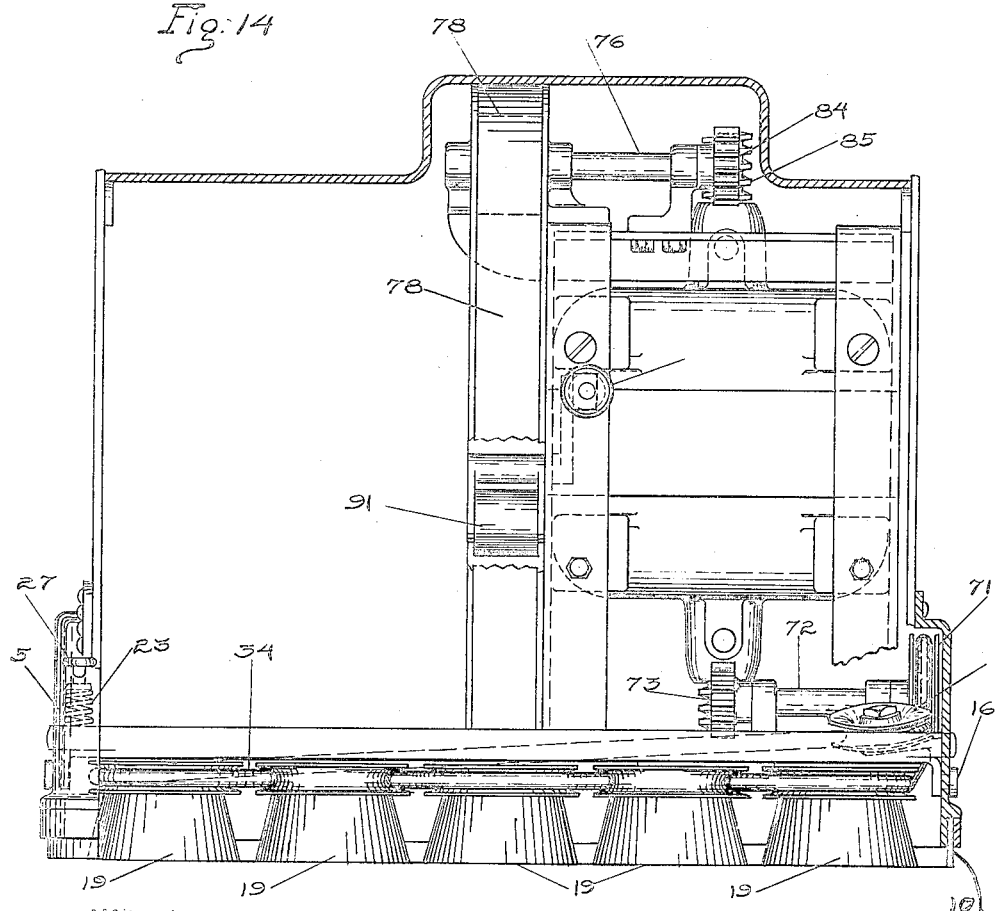

Aug. 26, 1924.
C. S. LUNDGREN
1,506,016
FLOOR SCRUBBING MACHINE
Filed July 19, 1919   9 Sheets-Sheet 9
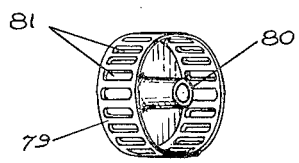
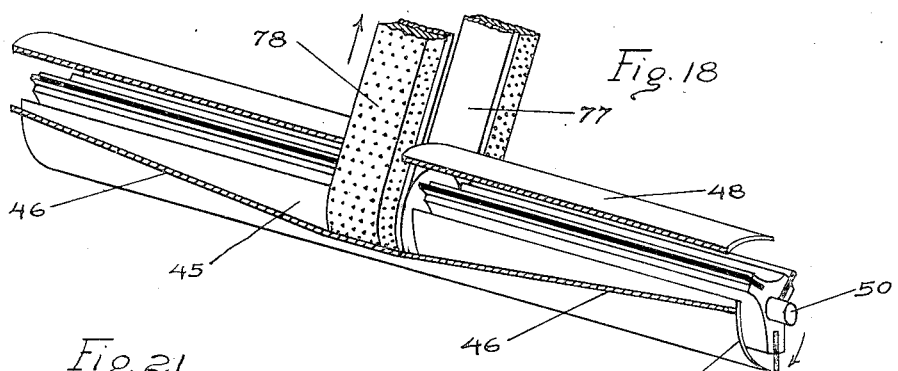
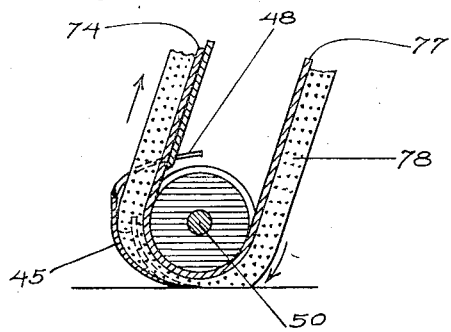

Patented Aug. 26, 1924.

1,506,016

UNITED STATES PATENT OFFICE.

CARL S. LUNDGREN, OF CHICAGO, ILLINOIS.

FLOOR-SCRUBBING MACHINE.

Application filed July 19, 1919. Serial No. 311,928.

*To all whom it may concern:*

Be it known that CARL S. LUNDGREN, a citizen of the United States, residing at Chicago, in the county of Cook and State of Illinois, has invented certain new and useful Improvements in Floor-Scrubbing Machines, of which the following is a specification.

This invention relates to new and useful improvements in floor scrubbing machines, and has for one of its objects to provide a scrubbing machine in which the parts are arranged in a very compact relation, whereby an extremely small sized machine may be constructed and thereby operated in an easy manner and in small rooms, closets, and corners of the same.

Another object of the invention is to provide a scrubbing machine, in which a supply of liquid is directed to the scrubbing brush, or brushes, and in which means are provided to retain the liquid on the floor within the area covered by the machine.

Another object of the invention is to provide a machine of the character described with means arranged in rear of the brush or brushes for picking up the used liquid and carrying the same either to a waste pipe or to a receiving tank.

A further object of the invention is to provide a machine for the purpose set forth, in which means are arranged transversely of the machine for picking up the used liquid from the floor and depositing the same into the end portions of a transversely disposed receiving conduit, which, in turn, directs the liquid to a centrally disposed position from which it is removed to a waste pipe or storage tank, as the case may be.

A still further object of the invention is to provide a series of brushes respectively arranged to rotate about vertical axes, and to provide means for continuously rotating the same in pairs, the brushes of each pair rotating in opposite directions, so that the adjacent portions thereof will travel in the same direction, and thereby prevent any undue wear which would otherwise occur should the brushes revolve in the same direction and contact one with the other.

A still further object of the invention is to provide a machine of the character described, in which the brushes, the spaced means for lifting the liquid into the conduit, and the means for elevating the used liquid from the conduit, are all operated from a prime mover, such as an electric motor.

A still further object of the invention is to provide a machine for the purpose set forth in which a means is provided for automatically elevating the machine upon backward movement thereof, so as to prevent the floor engaging scoop, which is carried by the liquid receiving conduit, from being injured, should the machine be drawn backwards over any obstruction.

A further important object of the invention is to provide means for varying the downward pressure exerted on the brushes.

These and other objects will in part be obvious, and will be hereinafter more fully disclosed.

In the drawings,

Figure 1 is a side elevation showing the preferred form of my invention.

Figure 2 is a horizontal view thereof, parts being shown in section.

Figure 3 is a front elevation of the machine, a portion thereof being broken away to better disclose the interior.

Figure 6 is a detail irregular transverse vertical sectional view taken on the line 6—6 of Figure 4.

Figure 7 is a detail vertical sectional view taken through one of the brushes.

Figure 8 is a detail view showing the normal position of the tripping mechanism.

Figure 9 is a similar view, but showing the tripping mechanism in its central operative position.

Figure 10 is a similar view, but showing the tripping mechanism in its extreme operative position.

Figure 11 is a side elevation of a modified form of machine.

Figure 12 is a longitudinal vertical sectional view therethrough.

Figure 13 is a horizontal sectional view thereof, with parts being shown in section.

Figure 14 is a front elevation, parts thereof being shown in section.

Figure 15 is a vertical sectional view through one of the brushes, and showing a slightly different construction from that contained in Figure 7.

Figure 16 is a detail sectional view showing one bearing for supporting the squeegees.

Figure 17 is a detail rear elevation showing one end of the liquid receiving conduit.

Figure 18 is a perspective view of the spaced squeegees, the liquid receiving conduit, and the lower end of the conveyor for elevating the liquid from the conduit, parts thereof being shown in section.

Figure 19 is a perspective view of the wringer.

Figure 20 is a perspective view of the drip pan, and

Figure 21 is a detail vertical sectional view showing the co-operative relation between the conveyor and the liquid receiving conduit.

Figure 4:
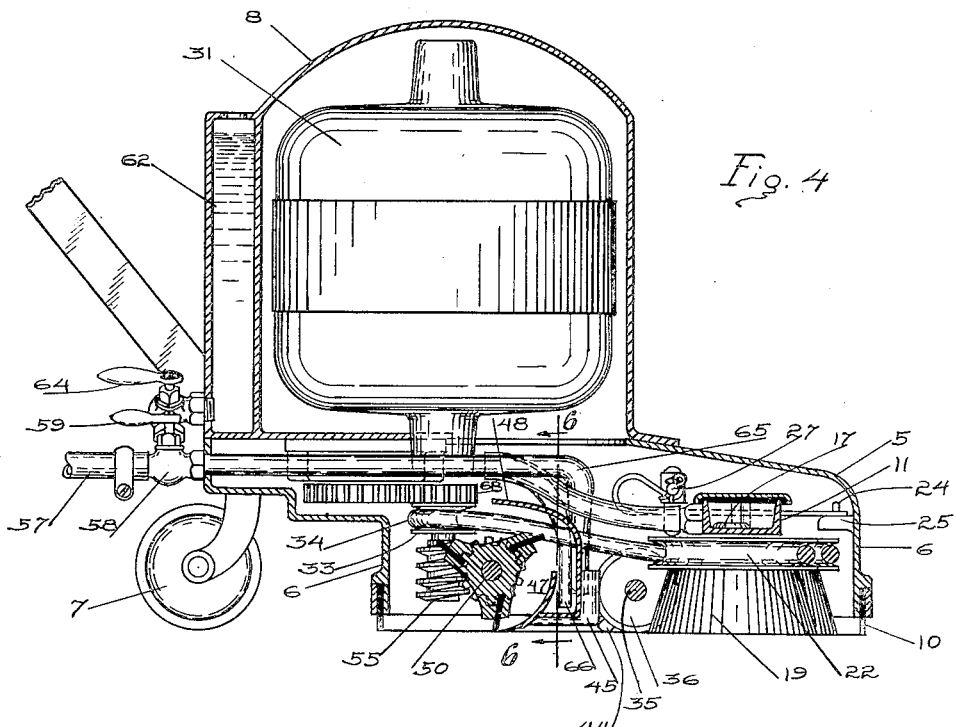
Figure 4 is a longitudinal vertical sectional view through the machine.
Figure 5:
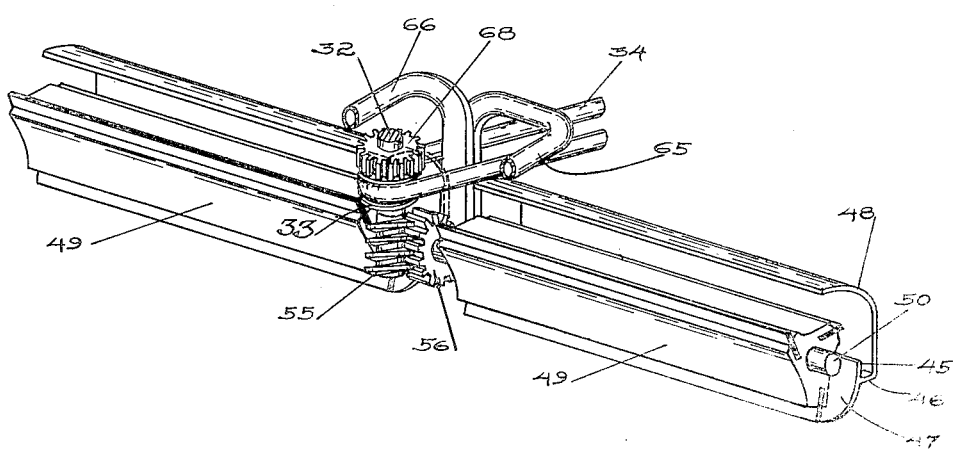
Figure 5 is a perspective view of the liquid receiving conduit, the spaced squeegees, the driving means for the latter, and the ends of the pipes disposed between the squeegees for respectively priming the machine, and for withdrawing the used liquid.

Referring to the drawings, I have shown a portable machine, which includes a casing 5 having an apron 6 extending downwardly along both sides, the front and back. The rear end of this casing is supported by a wheel 7. Detachably secured to the casing 5 is an upwardly extending drum 8. A handle 9 is pivotally attached to the rear portion of the casing 5.

Secured to the lower edge of the apron 6, and extending all around the same, is a rubber or other resilient guard 10, this guard being preferably formed from some yieldable material. This guard is very important, as it not only forms a protection against any foreign matter working its way underneath, but also engages the floor to retain the liquid within its confines, as will be hereinafter more fully explained.

Disposed within the casing 5, and extending transversely thereof, and adjacent the front end thereof, is a U-shaped bar 11.

The ends of this bar are closed, as indicated by the numeral 12, by bringing the side walls together. These side walls then extend outwardly in a longitudinal direction to form guide arms 13—13, and these guide arms extend outwardly through vertical openings 14 formed in the sides or apron of the casing 5. It will thus be seen that this bar 11 may be moved up and down for a limited extent. The ends of the bar 11 are respectively provided with downwardly extending feet 15, and guiding screws 16 extend into the slots 14 and engage the depending feet 15. Thus, by means of these screws 16 co-operating with the feet 15, the bar 11 is held against oscillating movement and is always caused to move vertically.

Secured to the bottom of the bar 11 is a plurality of depending hollow bearings 17, the longitudinal axis of each bearing being vertically disposed. Journaled on each of the bearings 17 is the head 18 of a rotary brush 19. Disposed between the bar 11 and head 18 are anti-friction balls 20. A clamping nut 21 is screwed on to the lower end of the bearing 17 and serves to lock the head 18 against downward movement. The head 18 is provided with a peripheral belt groove 22.

The brushes, of course, are adapted to rest on the floor, and in order to exert a downward pressure thereon, I have provided flat springs 23, which co-operate with the ends of the bar 11. One end of each spring 23 is fastened, as at 24, to a lug 25 carried by the casing. This spring passes through a slot 26 formed in the guide arm 13 of the bar 11. The free end of each spring is curved upwardly and backwardly and is thence bent around a tensioning screw 27. Each screw 27 is adjusted along a vertical slot 28 formed in the apron 6 of the casing 5. Threaded onto each screw is a nut 29 which co-operates with the head of the screw to hold said screw in any adjusted position.

A cover plate 30 is provided for the channel-shaped bar 11.

A scrubbing liquid is directed into the interior of the bar 11 in a manner hereinafter more fully described. It will thus be seen that this bar not only constitutes a transverse support for a series of rotary brushes rotating about vertical axes, but also constitutes a conduit for supplying the brushes with a scrubbing liquid. It will also be noted that this scrubbing liquid is directed to the centers of the brushes through the hollow bearings 17.

In order to drive these brushes, I have provided an electric motor 31, which has been diagrammatically illustrated in Figure 4. The motor is known as a vertical motor; that is, the armature shaft is arranged in a vertical plane. This motor is mounted within the hood 8, and intermediate the supporting wheel 7 and the brushes 19. The armature shaft 32 is provided adjacent its lower end with a pulley 33. The shaft 32 is centrally disposed between the sides of the casing 5. In this instance, I have shown four brushes 19, two of the brushes being arranged to the right of the shaft 32 and the other two being arranged to the left of the shaft 32. An endless belt 34 extends around the pulley 33, thence extends forwardly between the middle brushes and around the front faces of the grooves 22 thereof, and thence rearwardly around the rear faces of the grooves 22 of the outer or end brushes. It will thus be seen that the belt moves in a direction as indicated by the arrows, and consequently, the brushes on the right hand side are caused to revolve in opposite directions, and the brushes on the left-hand side are caused to revolve in opposite directions. Thus the adjacent portions of each pair of brushes are caused to revolve in the same direction. It will also be seen that by this driving connection, I have provided a very simple and direct connection which causes the brushes to be revolved with considerable speed.

In order to support the front end of the casing, I have provided a transverse axil 35, which is arranged directly in rear of the brushes and have mounted spaced supporting wheels 36 on said axil. The ends of the axil are off-set, as indicated at 37, and these off-set ends are suitably journaled in the apron 6 of the casing. Fixed to the axil 35 is a rock arm 38, and to the upper end of this arm is pivotally connected one end of an arm 39. The arm 39 extends rearwardly and is disposed at one side of the handle 9, and the extreme end thereof is formed into a hand piece 40. Carried by the arm 39 is a bracket 41, and threaded into the bracket is a screw 42, which is adapted to bear against the casing and thereby limit the inward movement of the arm 38. Secured to each off-set end of the axil 35 is a depending foot 43, and each foot is preferably provided with a resilient pad 44 of rubber or the like. These parts are normally in the positions shown in Figure 8.

Upon backward movement of the machine, the pads 44 will frictionally engage the floor and then become a fulcrum for the foot 43. The parts will rock to the intermediate position shown in Figure 9, and thence to the extreme position shown in Figure 10. Thus the wheels 36 will support the front ends of the casing above the floor level. This also relieves the brushes from the weight of the motor, and the flat springs 23 will then press the brushes against the floor. The axil 35, wheels 36, feet 43, together with the pads 44, constitute a trip mechanism which will elevate the front end of the casing when the machine is moved rearwardly. By adjusting the screw 42, the position of the pad 44 relative to the floor may be determined. When the tripping parts are in their normal positions, as shown in Figure 8, the weight of the motor causes the resilient guard 10 to closely hug the floor, and thereby keep the scrubbing liquid within its confines.

Disposed in rear of the axil 35 is a transversely arranged liquid receiving conduit 45. This conduit is supported by the casing and includes end portions and a central portion, the bottom 46 of the conduit along each end portion being downwardly inclined towards the center. The rear wall 47 of this conduit is curved downwardly below the bottom 46 and rearwardly thereof to form an arcuate guide. The front wall 48 of the conduit extends upwardly and overhangs the rear wall thereof.

In order to direct the used liquid from the floor into the end portions of the conduit, I have provided a pair of spaced squeegees 49—49, which are fixedly mounted on a transverse shaft 50, which extends outwardly through vertical openings in the casing. Outwardly extending lugs 51—51 are carried by the casing, and extending upwardly through each lug is a screw 52, each screw having a head 53 which receives the adjacent end of the shaft 50. A nut 54 is associated with each screw and co-operates with the lug 51 to raise and lower the screw, and consequently raise or lower the shaft 50. By adjusting the parts above noted, the position of the squeegees 49 relative to the floor may be varied. The shaft 50 is arranged intermediate the armature shaft 32, and the conduit 45, and it is so disposed that the squeegees will co-operate with the arcuate guide 47 to direct the used liquid into the end portions of the conduit 45. These squeegees are arranged in spaced relation so that the space between them is co-incident with the central portion of the conduit 45.

In order to operate the squeegees, the armature shaft 32 is provided at its lower end with a worm 55, which meshes with a worm gear 56 fixed to the shaft 50, said worm and gear being arranged intermediate the squeegees. It will thus be seen that as the armature shaft revolves, both squeegees will be rotated, and in a direction to deliver the liquid from the floor and upwardly along the guide 47 and into the end portions of the conduit 45. This liquid will, of course, gravitate to the central part of the conduit.

In order to supply liquid to the brushes, I have provided a flexible conduit 57, which is adapted to be connected to a faucet or the like. This pipe is connected to a valve casing 58 carried by the main casing 5, and this valve casing includes a hand-controlled valve 59. Connected to the valve casing 58 is a T-coupling 60, and connected to this coupling is one end of a pipe 61, the other end thereof being connected to the channel bar 11 at an intermediate point thereof. The valve 59 is a 2-way valve of ordinary construction, and in one position thereof the liquid will pass from the pipe 57 through the casing 58, pipe 61, and into the channel bar 11.

Supported by the drum 8 is a container 62 for containing a supply of liquid soap or other cleansing agent. At the lower end of this container is an outwardly extending valve 63 which is connected to the coupling 60 and controlled by a handle 64.

Also extending from the valve casing 58 is a pipe 65. This pipe 65 extends forwardly and has its free end extending downwardly into the central portion of the liquid receiving conduit 45. The flow of liquid through the pipe 65 is controlled by the hand lever 59. An exhaust pipe 66 is also provided and the inlet end thereof extends downwardly and into the central portion of the liquid receiving conduit 45. This pipe 66 is connected to a suction pump, which I have indicated as a whole by the numeral 67. This suction pump is operated by a gear 68 fixed to the armature shaft 32. Extending from the suction pump is an exhaust pipe 69, and the end of this pipe is connected to a flexible pipe 70, which may be led to a sink or the like.

In operation, the pipe 57 is first connected with a faucet or other source of water supply, and the valve 59 is then opened to permit the water passing along the pipe 65 and into the central portion of the conduit 45 in order to supply sufficient water to cover the lower end of the exhaust pipe 66. At the same time water is directed through the pipe 61 to the channel bar 11, and this water passes along the channel and thence downwardly into the centers of the respective brushes. As the machine is moved forward and the motor started, the brushes will, of course, be rotated, the squeegees will be rotated, and the suction pump will be actuated. The used water will be delivered into the end portions of the liquid receiving conduit 45, by means of the squeegees co-operating with the guide 47. This water will gravitate to the central portion of said conduit and will then be exhausted through the exhaust pipe 66. When it is desired to use the liquid soap or whatever cleansing agent is within the container 62, the valve 64 is opened.

From the foregoing, it will be seen that I have avoided the necessity of providing a mechanism which extends entirely across or transverse of the machine frame for the purpose of removing the used liquid; that I have provided means for maintaining the liquid on the floor and within the confines of the casing; and that I have provided an automatic tripping mechanism for elevating the front end of the casing, together with the liquid receiving conduit, whereby the floor engaging edge of said conduit will be prevented from becoming damaged should the machine be moved backward.

In the modified form, as illustrated in Figures 11 to 21 both inclusive, I have provided a scrubbing machine of a type quite similar to the one previously described, and I have, therefore, designated corresponding parts with similar reference numerals. To illustrate, I have provided a wheeled casing having a plurality of rotary brushes mounted at the front end and arranged in a transverse series. These brushes are rotated through the medium of an endless belt, which, however, in this instance, is driven from a pulley 71 arranged on a horizontal shaft 72 suitably journaled in the casing. A gear 73 meshes with the worm on the lower end of the armature shaft. I provide the same type of transversely disposed liquid conduit 45, and the spaced squeegees 49 as in my preferred form. In the modified form the channel bar is indicated by the character 11$^a$ and the cover plate therefor by the character 30$^a$.

Instead of using a suction device for removing the liquid from the conduit, I have provided an endless conveyor 74. This conveyor extends around a pulley fixed to the squeegee shaft 50. This conveyor extends upwardly and over a similar pulley 75 fixed to the shaft 76 which is rotatably supported on the frame. The front portion of the conveyor 74, that is, the upwardly moving portion, is held against sagging by a support 74$^a$. The conveyor embodies an endless driving belt 77, and to the outer face of this belt is attached a belting of sponge or the like 78. This conveyor extends downwardly between the squeegees and engages the floor and co-operates with the front wall 48 of the conduit to absorb the liquid carried thereto through the medium of the downwardly inclined end portions of said conduit.

This conveyor carries the liquid upwardly and the saturated sponge is then compressed through its engagement with a wringer 79. This wringer is drum-shaped and has an open side and a hub 80. The periphery is provided with a plurality of slots 81. The hub 80 is suitably journaled in the casing, and adjusting screws 82—82 are provided to vary the pressure of the wringer against the sponge section of the conveyor. Disposed within the wringer is an open-sided pan 83. The used water, after it leaves the pan 83, gravitates into a receiving tank 88.

The shaft 76 is provided with a gear 84, located directly above the motor shaft, and meshes with a worm 85 carried by said motor shaft. As a result of this driving connection, the lower end of the motor operates the brushes, while the upper end of the motor drives the conveyor, and the conveyor drives at its lower end the squeegees, and at its upper end, the wringer.

Instead of obtaining the liquid from a faucet or the like, I have provided a storage tank 86, and a pipe 87 leads from this tank to the channel bar 11.

In order to maintain proper tension on the conveyor, I have provided a belt tightener, which includes an arm 89 pivoted at 90 to the casing, and carrying at one end an idler roller 91. The other end of the arm has connection with an adjusting screw 92, by means of which the arm 89 may be rocked on its pivot and thereby applying more or less tension to the conveyor belt.

In order to trip the front part of the casing and elevate the same, I have provided a slightly modified mechanism. In this form, I have merely provided separate arms 93, each arm being pivotally connected, as at 94, to the casing. Each arm extends downwardly and rearwardly and is provided with a floor engaging point 95. A roller 96 is journaled on the arm. When the machine is being moved forwardly, the arm will drag on the floor, but when the machine is moved backwardly, the point 95 will engage the floor and become a fulcrum, causing the pivot 94 to move upwardly and over the point 95 until the roller 96 engages the floor. At this time the frame will be elevated and will be supported by the rollers 96.

Having thus described my invention, what I claim is:

1. In a floor scrubbing machine, the combination with a movable floor-engaging brush, of means for directing a supply of liquid to said brush, a transversely extending liquid-receiving conduit disposed in rear of said brush, and arranged to direct the liquid from the end portions to the center portion thereof, axially spaced means arranged to transfer the liquid from the floor into the end portions of said conduit, and means operating at the central portion of said conduit and disposed between said axially spaced means to remove the liquid therefrom.

2. In a floor scrubbing machine, the combination with a movable floor-engaging brush, of means for directing a supply of liquid thereto, a transversely disposed liquid-receiving conduit in rear of said brush and arranged to direct the liquid from the end portions to the central portion thereof, spaced squeegees operating about a transverse axis for transferring the liquid from the floor to the end portions of said conduit, and means operating at the central portion of said conduit and between the squeegees to remove the liquid from said conduit.

3. In a floor scrubbing machine, the combination with a movable floor-engaging brush, of means for directing a supply of liquid thereto, a transversely disposed liquid-receiving conduit arranged in rear of said brush and arranged to direct the liquid from the end portions to the central portion thereof, spaced squeegees operating about a transverse axis for transferring the liquid from the floor to the end portions of said conduit, said conduit having an open top and having an arcuate floor-engaging guide co-operating with said squeegees for directing the liquid into said conduit, and means operating at the central portion of said conduit and between the squeegees to remove the liquid from said conduit.

4. In a floor scrubbing machine, the combination with a plurality of brushes arranged in a transverse series and supported to rotate about vertical axes, of means for directing a supply of liquid to said brushes, a transversely disposed liquid-receiving conduit arranged in rear of said brushes, spaced squeegees located in rear of said conduit and operating to transfer the liquid into the end portions of said conduit, and means located between said squeegees and operating to remove the liquid from said conduit.

5. In a floor scrubbing machine, the combination with a casing, of a transversely disposed channel shaped bar supported thereon, a plurality of brushes mounted to rotate about hollow vertical bearings carried by said bar, said hollow bearings communicating with the interior of said channel bar, and means for supplying liquid to said channel bar.

6. In a floor scrubbing machine, the combination with a casing, of a transversely disposed channel shaped bar supported thereon for vertical movements, yieldable means for exerting a downward pressure on said bar, a plurality of brushes mounted to rotate about hollow vertical bearings carried by said bar, said hollow bearings communicating with the interior of said channel bar, and means for supplying liquid to said channel bar.

7. In a floor scrubbing machine, the combination with a casing, having a wheel support at its rear end, of a floor cleaning mechanism arranged within the casing, and means for automatically elevating the front end of the casing upon rearward movement of the machine.

8. In a floor scrubbing machine, the combination with a casing, having a wheel support at its rear end, of a floor cleaning mechanism arranged within the casing, and means for automatically elevating the front end of the casing upon rearward movement of the machine, said means comprising a transverse shaft having off-set ends journaled in the casing, a floor wheel journaled on said shaft, and a floor-engaging arm fixed to one of said off-set ends of said shaft.

9. In a floor scrubbing machine, the combination with a casing, having a wheel support at its rear end, of a floor cleaning mechanism arranged within the casing, and means for automatically elevating the front end of the casing upon rearward movement of the machine, said means comprising a transverse shaft having off-set ends journaled in the casing, a floor wheel journaled on said shaft, a floor-engaging arm fixed to one of said off-set ends of said shaft, and means to adjust the position of said arm relative to the floor.

10. In a floor scrubbing machine, the combination with a casing, having a wheel support at its rear end, of a floor cleaning mechanism arranged within the casing, and means for automatically elevating the front end of the casing upon rearward movement of the machine, said means comprising a transverse shaft having off-set ends journaled in the casing, a floor wheel journaled on said shaft, a floor-engaging arm fixed to one of said off-set ends of said shaft, and manually controlled means connected to said shaft for restoring said elevating means to its initial position.

In testimony whereof I affix my signature in the presence of two witnesses.

CARL S. LUNDGREN.

Witnesses:
ARTHUR T. LARRABEE,
W. P. LONG.